Aug. 16, 1938. C. H. SPAULDING 2,127,314
APPARATUS FOR CONDITIONING PRECIPITATES AND SEPARATING SAME FROM LIQUIDS
Filed April 10, 1936 4 Sheets-Sheet 4
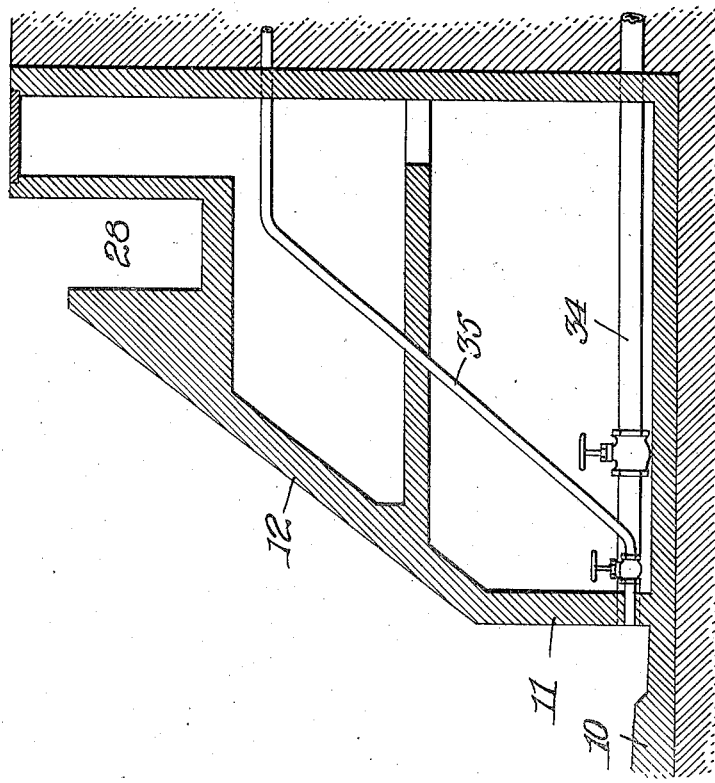
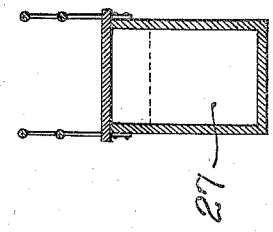
Inventor:
Charles H. Spaulding,
By Dyrenforth, Lee, Chritton & Wiles,
Attys.

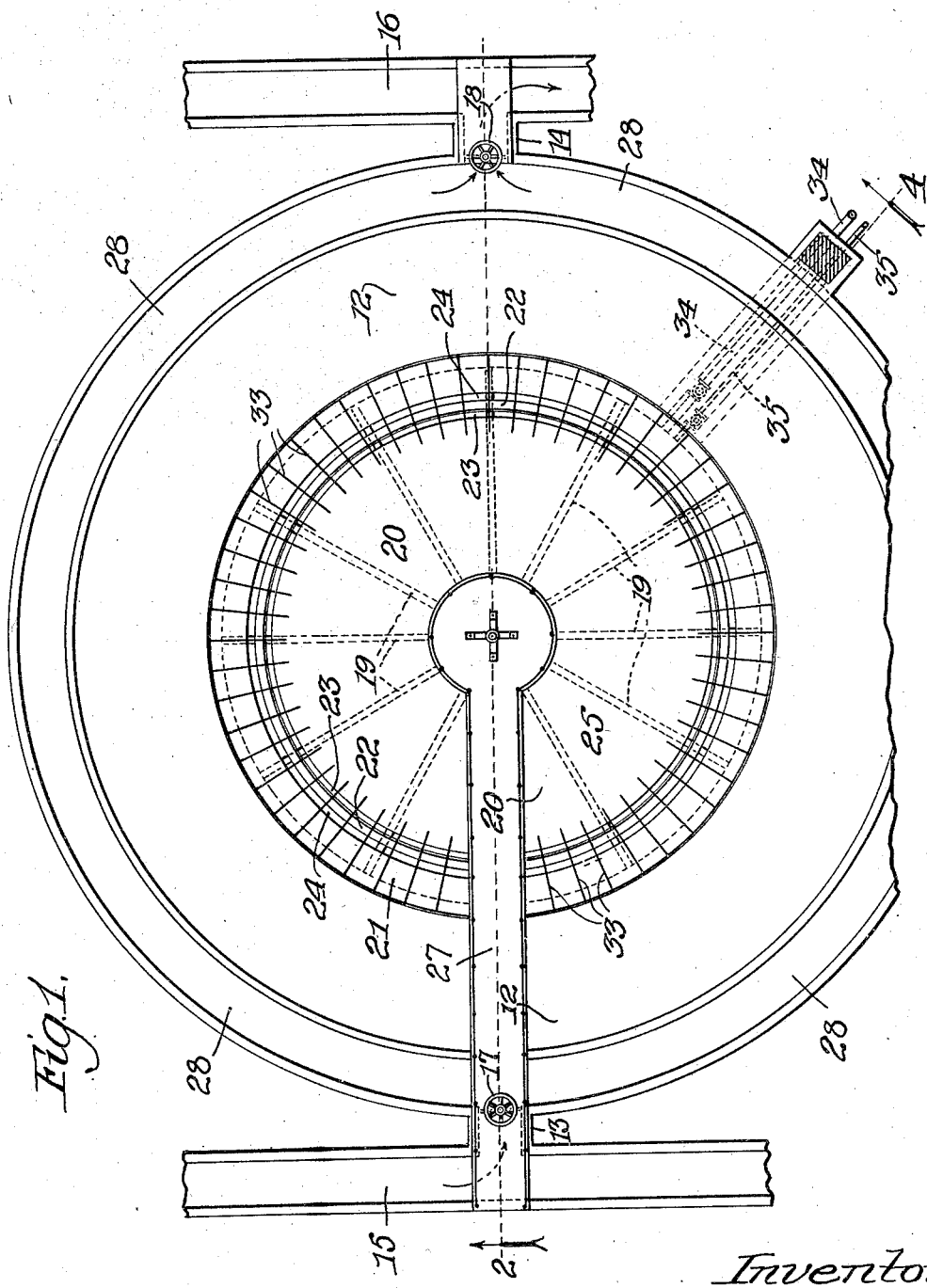

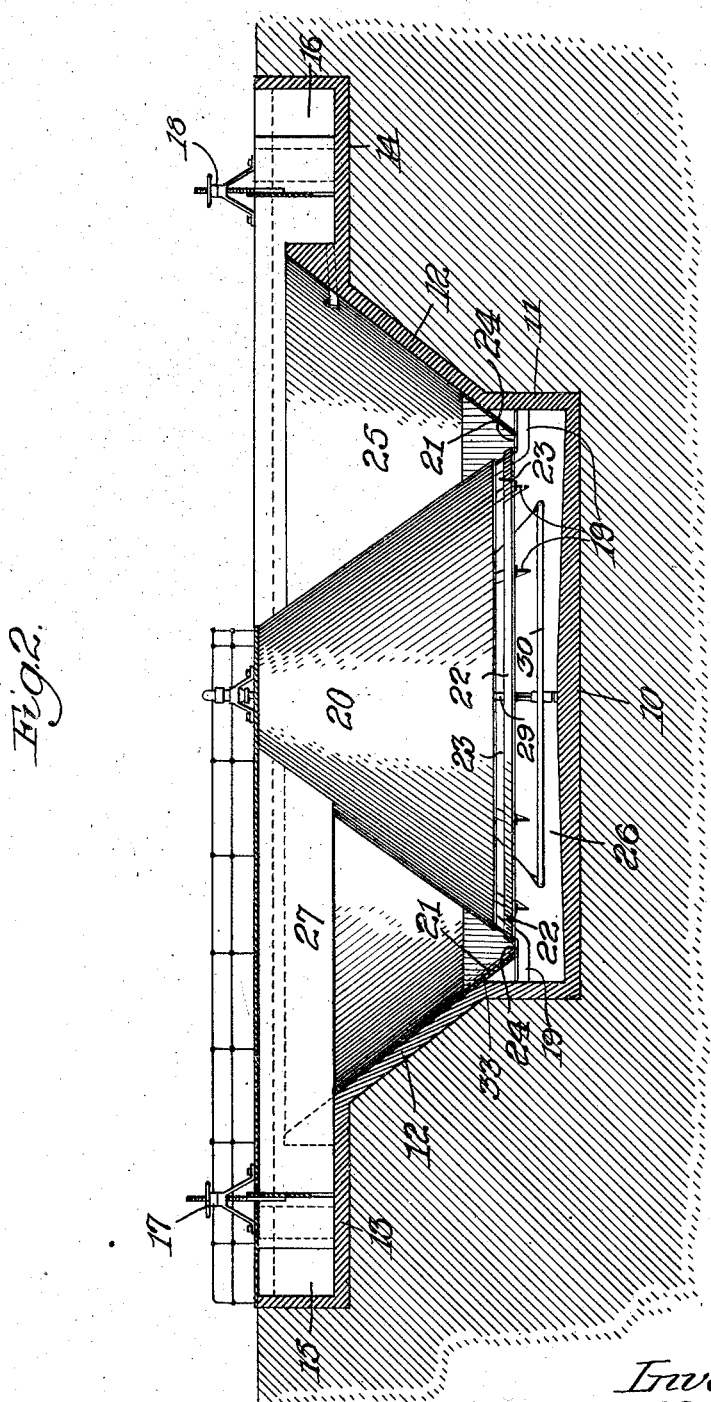

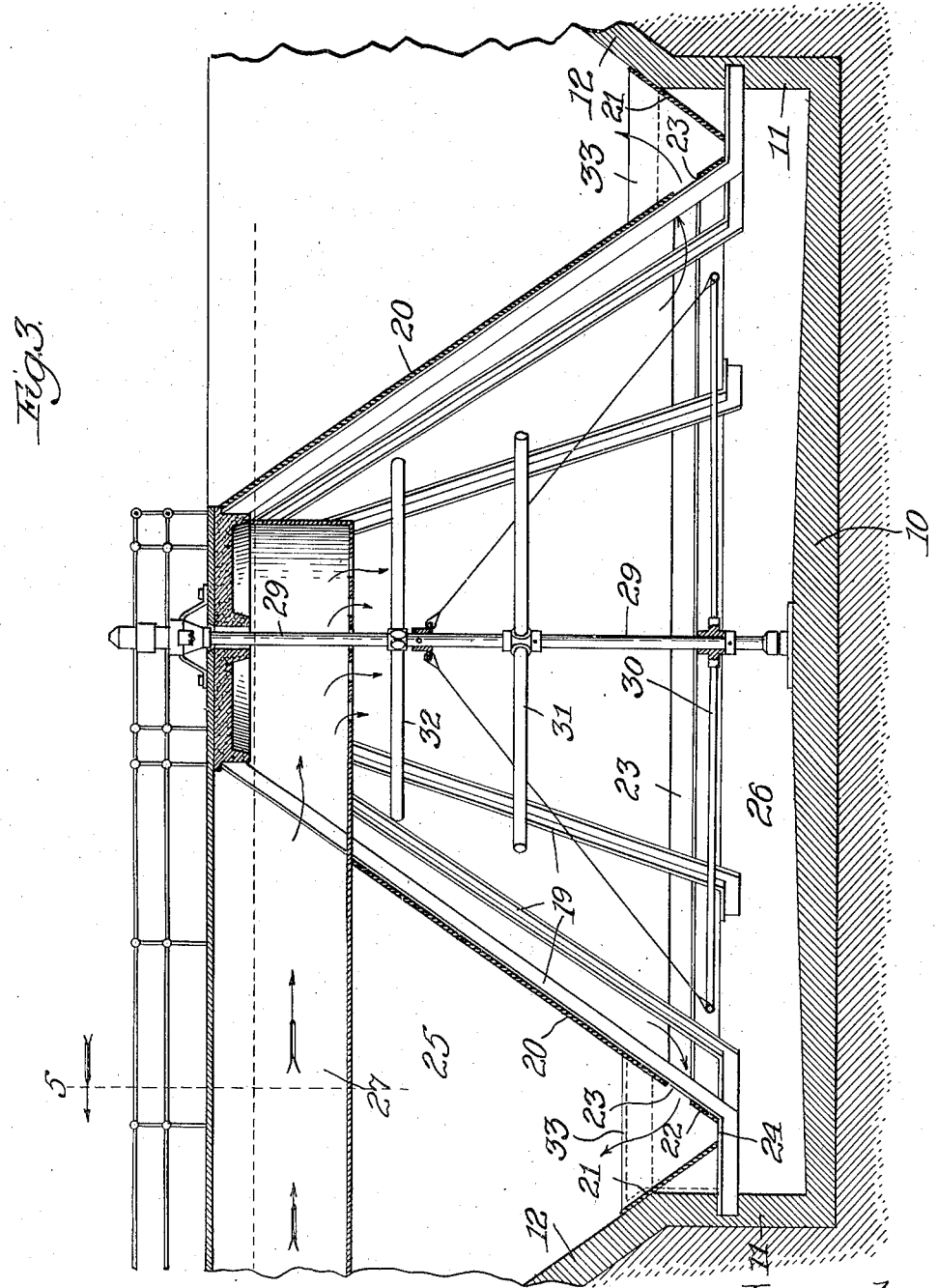

Patented Aug. 16, 1938

2,127,314

UNITED STATES PATENT OFFICE 2,127,314

APPARATUS FOR CONDITIONING PRECIPITATES AND SEPARATING SAME FROM LIQUIDS

Charles H. Spaulding, Springfield, Ill.

Application April 10, 1936, Serial No. 73,795

9 Claims. (Cl. 210—16)

This invention is an improvement on the device of my patent, No. 2,021,672, issued November 19, 1935. It is fully described in the following specification and illustrated in the accompanying drawings, in which—

Figure 1 is a plan of the structure; Fig. 2 is a vertical section on the line 2 of Fig. 1, the central parts being shown in elevation; Fig. 3 is a section on the same line through the central parts on a larger scale; Fig. 4 is a vertical radial section on the line 4 of Fig. 1; and Fig. 5 is a vertical section on the line 5 of Fig. 3.

Comparing the present mechanism with that of my patent above identified, the major difference is that the two vessels termed in the patent coagulating and precipitating vessels are reversed in position, the coagulating vessel in the present construction being the inner one and the precipitating vessel being the outer one. By this means, the precipitating vessel in which upward velocity should be kept at a low figure, can be made quite large in area without excessive increase in depth of structure and without proportional increase in the cost of construction and certain structural advantages are attained.

Referring to the drawings, 10 is a circular base portion at the margin of which rises a cylindrical portion 11 which merges into a flaring portion 12. These portions throughout the major part of the circumference of the structure are in the form of walls of a solid of revolution. This form is interrupted on the plane shown in section in Fig. 2 at the opposite ends of the diameter to form radial extensions 13, 14 communicating with inlet and outlet flumes 15, 16, the form of which is clearly illustrated. Valves 17, 18 are provided to control flow from and to the flumes, respectively.

The generally circular form of the structure is also interrupted in the plane shown in Fig. 4 to provide the radial chamber illustrated in that figure, which chamber is designed to contain certain piping, the use of which will presently appear.

The structure thus far described is preferably made of concrete and the form of the structure is such that the flaring part of the wall receives vertical support from the earth in which the structure is located. By this means, it is possible to make the outer upwardly flaring precipitating chamber of comparatively large size without corresponding increase in cost, as compared with the structure of my patent.

Within the walls and supported on suitably arranged beams 19 is a conical metal septum 20. The slope of the flaring walls 12 is continued downwardly by a plate 21 of downwardly pointing frusto-conical form and the space between the lower edge of the plates 20 and 21 is in part filled by a plate 22 leaving slots 23 and 24 through which precipitate can descend vertically by gravity from the outer precipitating vessel indicated by 25, to the coagulating vessel, indicated generally by 26.

The intake flume 15 communicates through a radial flume 27 with the upper part of the frusto-conical coagulating chamber 26. Surrounding the upper part of the precipitating chamber 25 is a circular collecting flume 28 into which treated water escapes over the upper margin of the flaring wall 12. This collecting flume is connected as illustrated with the outlet flume which draws off the treated water.

Within the coagulating compartment or vessel is a stirring mechanism comprising a shaft 29 and outwardly extending stirring arms 30, 31 and 32. This mechanism produces quite thorough admixture of the incoming raw water and precipitating agent.

To stop agitation and prevent the circular flow set up by the agitator of the water passing from the coagulating to the precipitating chamber, the latter at its lower end is provided with a large number of radial baffles 33.

The arrangement of the coagulating chamber, the wall 11, and the precipitating compartment with respect to the agitator in the present device is such that water moves evenly through the slots 23 and 24 at all points. This result is of great importance in a device of this character, wherein dependence is placed upon diminishing of velocity to produce a rather static layer of precipitated material within the compartment which acts as seed. This action is seriously interfered with when the upper layer of the sustained particles is not on a substantially horizontal plane.

In Fig. 4, the lower pipe 34 is a drain pipe by which the entire structure can be emptied, if necessary. The pipe 35 is a sludge draw-off pipe which is employed continuously or at intervals to draw off sludge which tends to accumulate at the bottom of the coagulating compartment.

The operation will now be described. The raw water enters through the inlet flume 15, being mixed with the reagent, usually milk of lime, at a point not shown. The raw water and the precipitant more or less dissolved flow along at sufficient speed to avoid precipitation, pass through the radial flume 27 and down into the coagulating compartment 26. In its passage therethrough, complete and quite thorough mixing is brought about and considerable precipitate is formed. The water with much of its sludge in suspension then rises through the slots 23 and 24 into the precipitating compartment. As it enters, circumferential motion is arrested by the baffles 33 and the water rises upward, its vertical velocity being very rapidly reduced by reason of the increasing cross-sectional dimensions of the precipitating compartment. At some point, depending upon the amount of water being driven through the apparatus, the vertical velocity is so reduced that the sludge particles can no longer rise with the water and they remain in suspension at this point, maintaining a fairly visible but mobile level much as sand attains a vertical level in a spring. The sludge particles thus moving around in the gently rising stream constantly grow in size, partly by the precipitation upon them of unprecipitated material and perhaps partly by a slight solution and reprecipitation by which the larger particles tend to grow at the expense of the smaller ones. The particles necessarily operate as seed for the formation of further precipitate and the treated water in passing through the considerable zone at the bottom of the precipitating compartment where the sludge is held in suspension is very completely denuded of precipitated matter.

The treated water in the precipitating compartment above the level where sludge is held in suspension is not only extremely soft but extremely clear. This water escapes into the circular collecting flume and is drawn off. It may, of course, be subjected to further treatment, such as recarbonating, if desired.

The apparatus substantially as illustrated with a radius of 34' 3" to the point of overflow into the collecting flume has been operated with a theoretical detention period of 58 minutes and has secured both an increase in the reduction of alkalinity and a decrease in turbidity as compared with the old type of rectangular basin precipitator with a theoretical detention time of 8 hours and 46 minutes.

It will be observed that the present apparatus, as compared with that of my patent, in effect secures a very large area for the precipitating compartment with no corresponding increase in the size of the coagulating compartment. In the latter, slow flow is not at all necessary and in so far as it is at all desirable, it is in general better to have the velocity decrease throughout the flow of the water as in the present apparatus. Furthermore, by flaring the outer walls of the structure, the large area of the precipitating compartment and the consequent slow upward velocity is attained without great increase in cost because the flaring walls can be sufficiently supported by the earth surrounding the structure. The principle in my patent, therefore, receives in the present apparatus extremely economical and efficient embodiment.

As set forth in my Patent 2,021,672, the walls of the precipitating chamber should have a slope steep enough so that the material settling thereon will ultimately slide into the zone of agitation, and normally a slope of 45–60° is satisfactory. As illustrated in the drawings in the present application, a slope of approximately 50° is preferred.

The structure herein illustrated has a cross-sectional diameter considerably greater than its depth, which results in very considerable savings in cost as compared with the structure shown in my patent. In that arrangement, in order to increase the area, the depth must likewise be considerably increased, whereas in the present case the increase in the area of the precipitating chambers has been accomplished without increase in depth.

The foregoing detailed description has been given for clearness of understanding only, and no unnecessary limitations should be understood therefrom, but the appended claims should be construed as broadly as permissible, in view of the prior art.

What I claim as new, and desire to secure by Letters Patent, is:

1. A device of the character described for the purification of water supplies including the removal of soluble impurities therein of inverted frusto-conical form divided by a partition in the form of the surface of a cone into an inner generally conical coagulating compartment and an outer annular upwardly flaring precipitating compartment, the two compartments communicating by openings at their lower ends to provide free passage for the rise of water and for the substantially vertical descent of precipitate countercurrent to the water, means to supply raw water to the coagulating compartment admixed with but not wholly reacted upon by a reagent, means to agitate the water in the coagulating compartment and means to draw off clear water from the upper part of the precipitating compartment.

2. A device according to claim 1, in which the raw water is supplied to the upper part of the coagulating compartment.

3. A device according to claim 1, including a radial flume extending over the precipitating compartment to supply the raw water to the upper part of the coagulating compartment.

4. A device according to claim 1, including means consisting of stationary radial baffle plates at the lower end of the precipitating compartment to arrest circumferential movement of the water entering it.

5. A device according to claim 1, having an annular flume around the upper part of the precipitating compartment into which clear water may overflow therefrom.

6. A device according to claim 1, in which the agitating means operates to impart a circular motion to the water, and means are provided at the lower end of the precipitating compartment to arrest circulating motion of the water as it enters the compartment.

7. A device of the character described for the purification of water supplies including the removal of soluble impurities therein, of inverted frusto-conical form divided by a partition in the form of a surface of a cone into an inner generally conical coagulating compartment and an outer annular upwardly flaring precipitating compartment, the two compartments communicating by openings at their lower ends to provide free passage for the rise of water and for the substantially vertical descent of precipitate countercurrent to the water, means to supply raw water to the coagulating compartment, admixed with but not wholly reacted upon by a reagent, and means to draw off clear water from the upper part of the precipitating compartment, the device having a substantially greater cross-section than its depth.

8. A device of the character described for the purification of water supplies including the removal of soluble impurities therein comprising a concrete basin of inverted frusto-conical form divided by a partition in the form of the surface of a cone into an inner generally conical coagulating compartment and an outer annular upwardly flaring precipitating compartment, said upwardly flaring precipitating compartment having its outer walls supported upon earth in which the device is imbedded, the two compartments communicating by openings at their lower ends to provide free passage for the rise of water and for the substantially vertical descent of precipitate countercurrent to the water, means to supply raw water to the coagulating compartment admixed with but not wholly reacted upon by a reagent, means to agitate the water in the coagulating compartment, and means to draw off clear water from the upper part of the precipitating compartment.

9. A device as set forth in claim 1, in which the agitating means, the precipitating compartment and the coagulating compartment are so arranged as to produce substantially equal movement of water at all points from the coagulating compartment to the precipitating compartment, whereby a substantially level upper surface is provided for precipitating material in the precipitating compartment.

CHARLES H. SPAULDING.